(12) United States Patent
Mandel

(10) Patent No.: US 9,644,865 B2
(45) Date of Patent: May 9, 2017

(54) THERMAL SHIELD FOR SOLAR RECEIVER

(75) Inventor: Johnny Mandel, West Hills, CA (US)

(73) Assignee: SOLARRESERVE TECHNOLOGY, LLC, Santa Monica, CA (US)

( * ) Notice: Subject to any disclaimer, the term of this patent is extended or adjusted under 35 U.S.C. 154(b) by 995 days.

(21) Appl. No.: 12/730,203

(22) Filed: Mar. 23, 2010

(65) Prior Publication Data
US 2011/0232629 A1   Sep. 29, 2011

(51) Int. Cl.
F24J 2/46 (2006.01)
F24J 2/07 (2006.01)
F24J 2/52 (2006.01)

(52) U.S. Cl.
CPC . *F24J 2/07* (2013.01); *F24J 2/52* (2013.01); *Y02E 10/41* (2013.01)

(58) Field of Classification Search
CPC . F24J 2/52; F24J 2/00; F24J 2/42; F24J 2/44; F24J 2/46; F24J 2/07; E04D 13/17; E04D 13/18; E04D 1/34; E04D 3/36
USPC ....... 126/569, 570, 585, 600, 620, 621, 622, 126/623, 634, 636, 658, 659, 661, 680, 126/704, 714; 136/251
See application file for complete search history.

(56) References Cited

U.S. PATENT DOCUMENTS

| | | | |
|---|---|---|---|
| 2,569,097 A * | 9/1951 | Grange | C23C 2/30 148/26 |
| 4,136,674 A | 1/1979 | Korr | |
| 4,204,862 A * | 5/1980 | Kado et al. | 420/40 |
| 4,244,189 A | 1/1981 | Bliamptis | |
| 4,245,618 A | 1/1981 | Wiener | |
| 4,289,114 A | 9/1981 | Zadiraka | |
| 4,373,514 A | 2/1983 | Lois | |
| 4,384,550 A * | 5/1983 | Miller | 122/510 |
| 4,485,803 A | 12/1984 | Wiener | |
| 4,947,825 A | 8/1990 | Moriarty | |
| 5,149,351 A | 9/1992 | Yaba et al. | |
| 5,150,253 A | 9/1992 | Watanuki | |
| 5,275,150 A | 1/1994 | Lai | |
| 5,404,868 A | 4/1995 | Sankrithi | |
| 5,404,869 A | 4/1995 | Parkyn, Jr. et al. | |
| 5,518,554 A | 5/1996 | Newman | |
| 5,578,140 A | 11/1996 | Yogev et al. | |
| 5,660,644 A | 8/1997 | Clemens | |
| 5,715,809 A | 2/1998 | Schmitz-Goeb et al. | |
| 5,741,445 A | 4/1998 | Taylor et al. | |
| 5,751,503 A | 5/1998 | Blackmon et al. | |
| 5,850,831 A | 12/1998 | Marko | |
| 5,862,800 A | 1/1999 | Marko | |
| 5,910,371 A | 6/1999 | Francel et al. | |
| 5,915,376 A | 6/1999 | McLean | |
| 5,947,114 A | 9/1999 | Kribus et al. | |
| 5,956,191 A | 9/1999 | Blackmon et al. | |
| 5,979,438 A | 11/1999 | Nakamura | |
| 6,003,508 A | 12/1999 | Hoffschmidt et al. | |
| 6,045,231 A | 4/2000 | Martineau | |
| 6,080,927 A | 6/2000 | Johnson | |
| 6,131,565 A | 10/2000 | Mills | |
| 6,414,237 B1 * | 7/2002 | Boer | 136/251 |
| 6,415,783 B1 | 7/2002 | Harrison | |

(Continued)

*Primary Examiner* — Gregory Huson
*Assistant Examiner* — Aaron Heyamoto
(74) *Attorney, Agent, or Firm* — Kagan Binder, PLLC

(57) ABSTRACT

A solar receiver system includes a panel mounted to a multiple of standoffs such that the panel is spaced away from the support structure to provide convective cooling.

20 Claims, 6 Drawing Sheets

(56) References Cited

U.S. PATENT DOCUMENTS

| | | | |
|---|---|---|---|
| 6,513,518 B1 | 2/2003 | Girerd | |
| 6,530,369 B1 | 3/2003 | Yogev et al. | |
| 6,911,110 B2 | 6/2005 | Blackmon, Jr. et al. | |
| 6,931,851 B2 | 8/2005 | Litwin | |
| 7,051,529 B2 | 5/2006 | Murphy et al. | |
| 7,299,633 B2 | 11/2007 | Murphy et al. | |
| 2010/0101564 A1* | 4/2010 | Iannacchione et al. | 126/680 |
| 2010/0313877 A1* | 12/2010 | Bellman et al. | 126/653 |
| 2011/0284077 A1* | 11/2011 | Stedwell et al. | 136/259 |

\* cited by examiner

THERMAL SHIELD FOR SOLAR RECEIVER

BACKGROUND

The present disclosure relates to a concentrated solar power tower system, and more particularly to a thermal shield for central solar receiver therefore.

Heliostats are mirror structures that direct the sun's energy to a central receiver to produce electric power. The heliostat and central receiver are often referred to as a concentrated solar power tower system.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
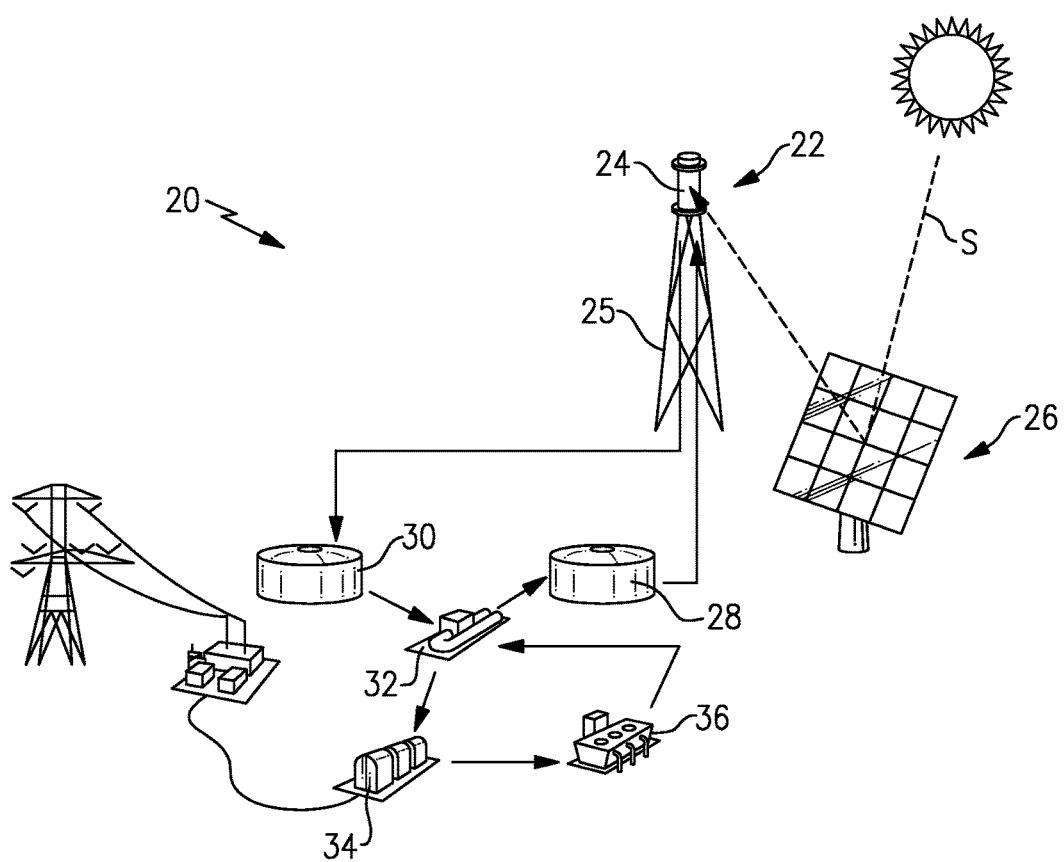
FIG. 1 is a general schematic view of a solar power tower system for use with the present application.

Referring to FIG. 1, a solar power tower system 20 includes a high concentration solar receiver system 22 having a receiver assembly 24 coupled to a tower structure 25 at a predetermined height above ground to receive solar radiation S. A multiple of sun-tracking mirrors or heliostats 26 focus solar radiation S onto the receiver assembly 24. In one non-limiting embodiment, a solar power tower system 20 operable to produce 100 megawatts of electric power may require approximately 40,000 16 ft×16 ft heliostats 26.

Molten salt or other thermal transfer fluid is communicated from a cold storage tank system 28 through the solar receiver system 22 and heated thereby. The heated thermal transfer fluid is then communicated to a hot storage tank system 30. When power is required, the hot thermal transfer fluid is pumped to a steam generator system 32 to produce steam. The steam drives a steam turbine/generator system 34 that creates electricity for communication to a power grid. From the steam generator, the thermal transfer fluid is returned through a condenser system 36 to the cold storage tank system 28, where the thermal transfer fluid is stored and eventually reheated in the solar receiver system 22. It should be understood that although a particular component arrangement is disclosed in the illustrated embodiment, any arrangement with a solar receiver system 22 will also benefit herefrom.

Figure 2:
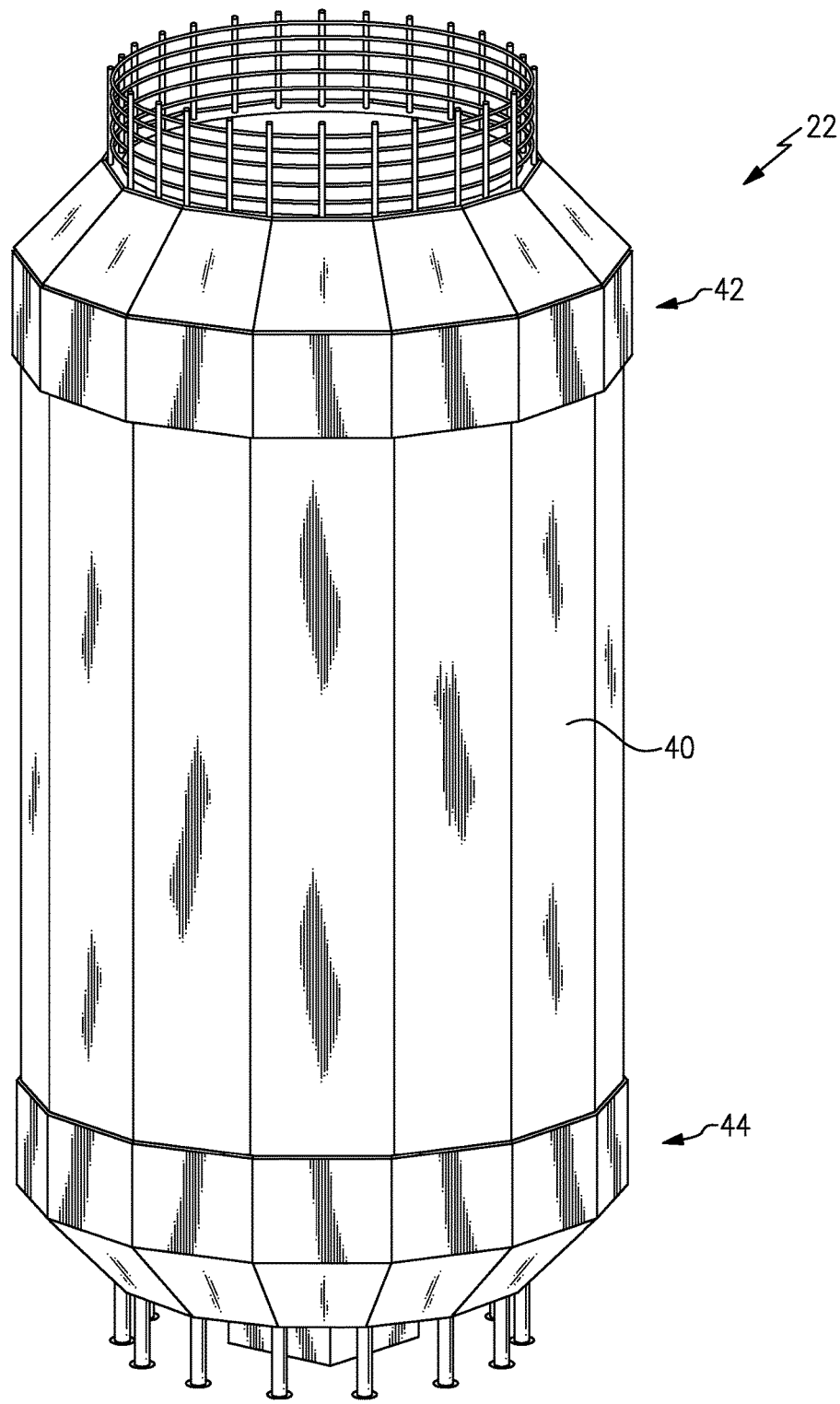
FIG. 2 is a perspective view of a solar receiver.
Figure 3:
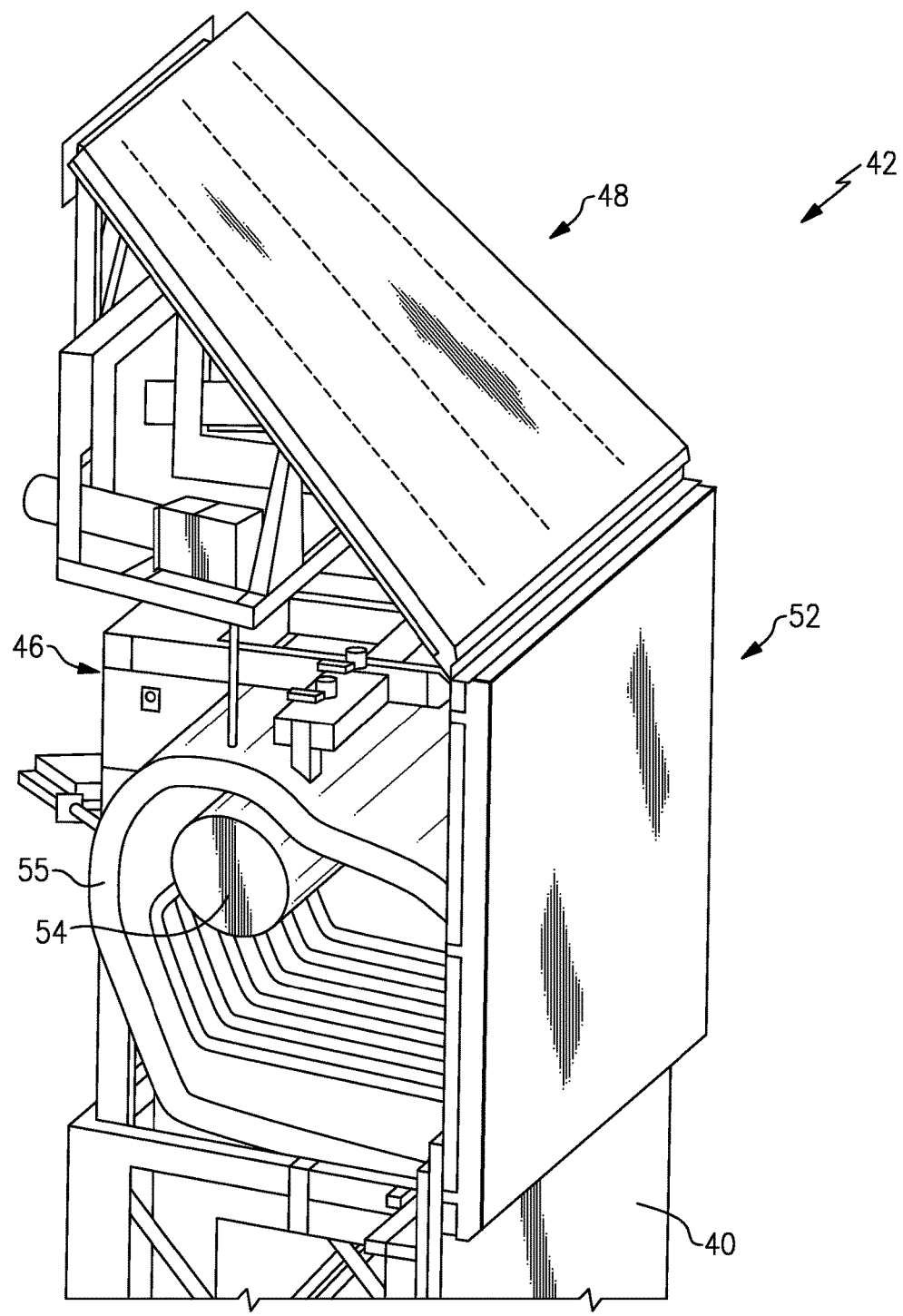
FIG. 3 is a perspective view of an upper cover assembly adjacent to a concentrated solar power receive panel for the solar receiver.
Figure 4:
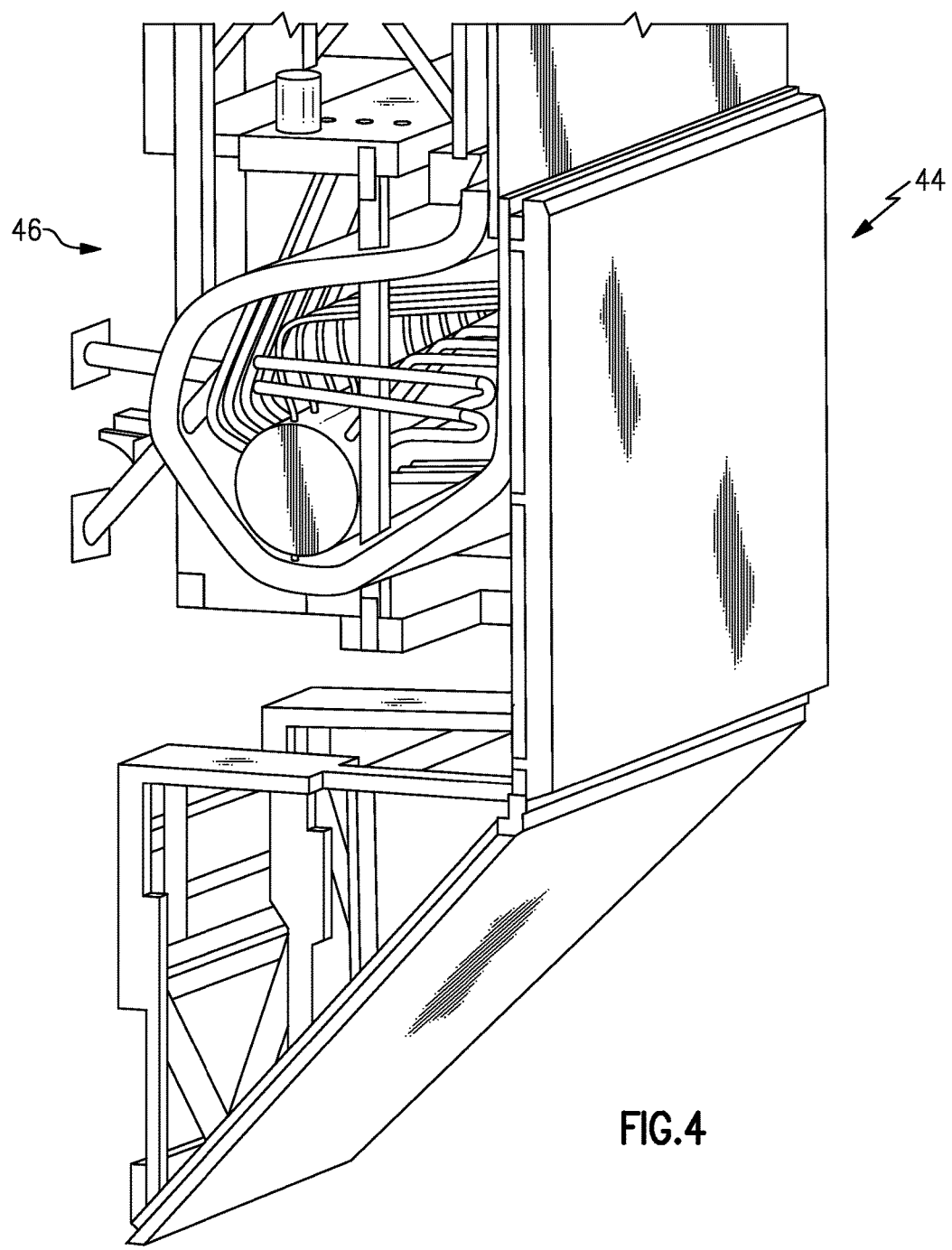
FIG. 4 is a perspective view of a lower cover assembly adjacent to a concentrated solar power receive panel for the solar receiver.

Referring to FIG. 2, the solar receiver system 22 generally includes a multiple of concentrated solar power (CSP) receiver panels 40 between a multiple of upper cover assemblies 42 (one shown separately in FIG. 3) and a multiple of lower cover assemblies 44 (one shown separately in FIG. 4). It should be understood that various cover assemblies may alternatively or additionally be provided. The cover assemblies 42, 44 generally protect the support structure 46 and the equipment therein (FIGS. 3 and 4) from heliostat spillage which may miss the CSP receiver panels 40. The solar energy from heliostat spillage may result in maximum heat flux of 300 kW/m2 and a maximum temperature of 1900° F. applied to the assemblies 42, 44.

Referring to FIG. 3, one of the multiple of upper cover assemblies 42 will be described in detail hereafter, however, it should be understood that each of the multiple of upper cover assemblies 42 and lower cover assemblies 44 are generally comparable such that only the single upper cover assembly 42 need be described in detail herein.

The upper cover assembly 42 generally includes a sloped thermal shield 48, in front of an insulation 50, a thermal shield assembly 52, and a header assembly 54 which communicates and distributes the heated thermal transfer fluid through the CSP receiver panels 40. The header assembly 54 may be encased in a thermal blanket 55 and is mounted to the support structure 46 behind an access door 56. The thermal shield assembly 52 may be mounted to the access door 56. It should be understood that other support structures such as cement or composite materials at other locations on the central solar receiver system 22 may also benefit from the thermal shield assembly 52.

The sloped thermal shields 48 are displaced from the CSP receiver panels 40 and may be subject to less heliostat spillage than the thermal shield assembly 52. The sloped thermal shield 48 may be manufactured of, in one non-limiting embodiment, Aluminized 304 stainless steel.

Figure 5:
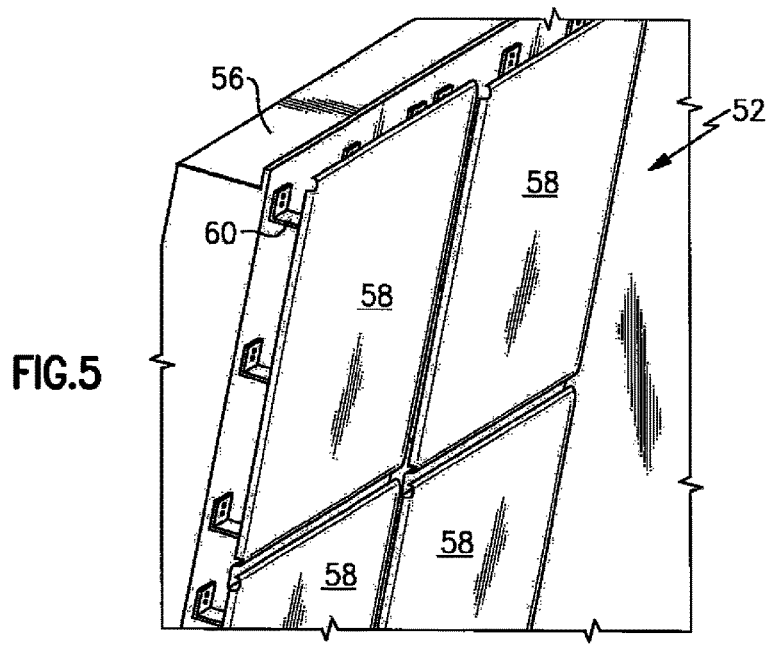
FIG. 5 is a perspective view of a thermal shield assembly.

Referring to FIG. 5, the thermal shield assembly 52 includes a multiple of panels 58, each of which are mounted to the access door 56 through a multiple of standoffs 60. The multiple of standoffs 60 permit convective cooling between the multiple of panels 58 and the support structure 46 such as the access door 56. That is, a gap is provided between the panels 58 and the access door 56 by the standoffs 60 to provide convection cooling and shading of the support structure 46 from solar radiation.

Each of the multiple of panels 58 may be manufactured of, in one non-limiting embodiment, of Aluminized 310s stainless steel which is rated for temperatures upward of 2100° F. (1149° C.). The aluminum coating may be diffusion bonded to the 310s stainless steel such that the aluminum oxide forms on the surface as a protective layer that will reform if damage and prevent oxidization of the 310s stainless steel panel. It should be understood that various chemical bonding arrangements may alternatively be utilized. Each of the multiple of panels 58 may be manufactured of a relatively thin material which results in a relatively light thermally protective structure as compared to conventional ceramic protection arrangements. In one non-limiting embodiment, each of the multiple of panels 58 are approximately 0.06 inches (1.5 mm) thick.

Figure 6:
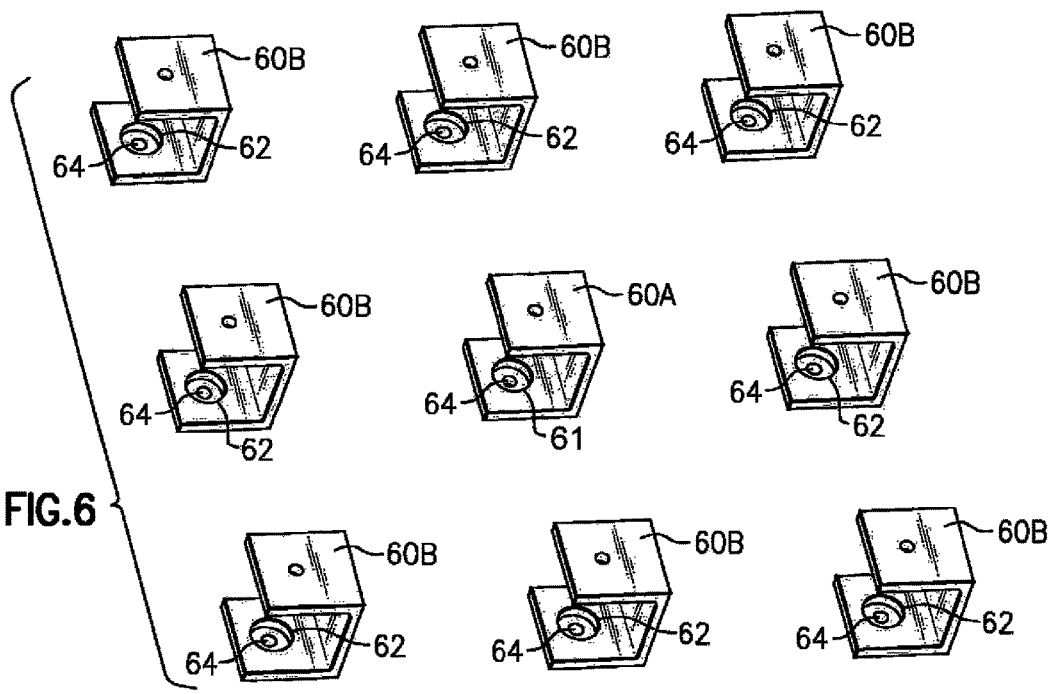
FIG. 6 is a schematic view of a standoff arrangement for one panel of the thermal shield assembly.

The multiple of standoffs 60 are arranged with a central fixed standoff 60A surrounded by a multiple of floating standoffs 60B which includes an enlarged aperture 62 (FIG. 6). The fixed standoff 60A includes a small aperture 61 which closely fits a fastener 64 such that the fixed standoff 60A does not move with respect to the support structure 46. The central fixed standoff 60A and the multiple of floating standoffs 60B accommodate the movement of each panel 58 through the enlarged aperture 62 due to thermal expansion. That is, a fastener 64 which extends through the enlarged aperture 62 is provided with a clearance that accommodates the movement of each panel 58 from thermal expansion.

Figure 7A:
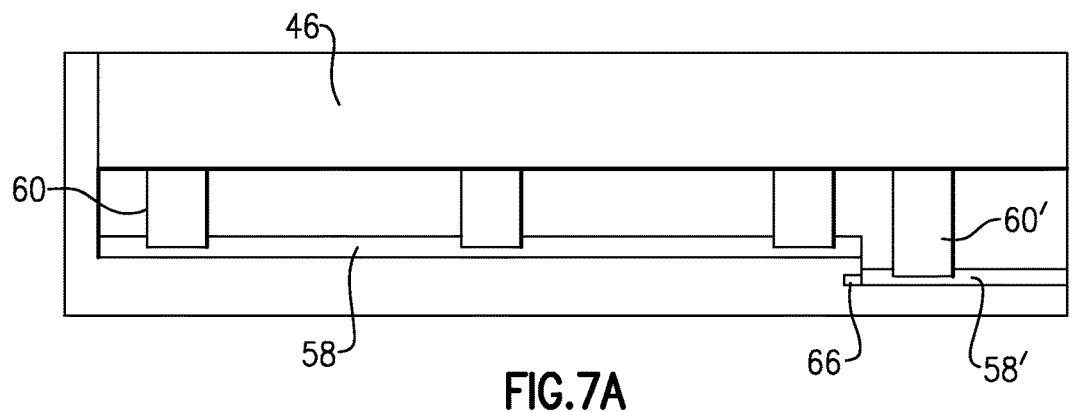
FIG. 7A is a top view of a thermal shield assembly.
Figure 7B:
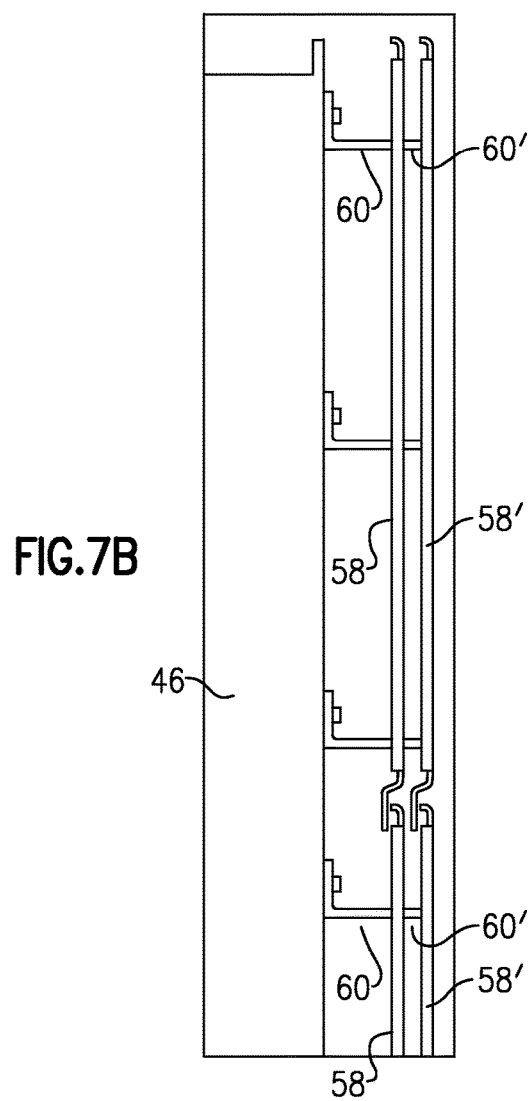
FIG. 7B is a side view of the thermal shield assembly.

Each adjacent panel 58 of the multiple of panels 58 may also be spaced from the support structure 46 through a respective multiple of standoffs 60 which are of different heights (FIG. 7A). That is, one panel 58 is supported by the multiple of standoffs 60 which are of one height while an adjacent panel 58' which is supported by a multiple of standoffs 60' of another height so as to permit panel 58 to move at least partially under panel 58'. It should be understood that each standoff 60, 60' arrangement for each panel 58, 58' includes a thermal expansion arrangement as illustrated in FIG. 6.

An offset seal 66 may also extend from each panel 58, 58' to close a gap between adjacent panels 58. The offset seal 66 may be utilized with panels 58, 58' that are displaced an equivalent distance from the support structure 46. That is, the offset seal may include a stepped interface to close the gap. It should be understood that various such arrangements may be provided.

The thermal shield assembly 52 is durable; lightweight; resistant to environmental exposure; easy to manufacture; and readily installed.

It should be understood that like reference numerals identify corresponding or similar elements throughout the several drawings. It should also be understood that although a particular component arrangement is disclosed in the illustrated embodiment, other arrangements will benefit herefrom.

It should be understood that relative positional terms such as "forward," "aft," "upper," "lower," "above," "below," and the like are with reference to the normal operational arrangement and should not be considered otherwise limiting.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A solar power system, comprising:
a support structure;
a solar power receiver including a concentrated solar power receiver panel and a header assembly mounted to said support structure, wherein the header assembly is configured to communicate and distribute a thermal transfer fluid through the solar power receiver such that the thermal transfer fluid is heated by concentrated solar radiation received by said concentrated solar power receiver panel;
at least one cover assembly to protect said support structure and the header assembly from heliostat spillage that misses said concentrated solar power receiver panel, said at least one cover assembly comprising a stainless steel panel;
wherein a surface of said stainless steel panel is coated with an aluminum coating,
wherein said stainless steel panel is supported relative to said support structure upon a central fixed standoff;
wherein said stainless steel panel is also supported relative to said support structure by a plurality of floating standoffs that accommodate movement of said stainless steel panel with respect to said support structure, wherein said plurality of floating standoffs surround the central fixed standoff on at least three sides, and wherein said plurality of floating standoffs are each configured to float relative to said support structure in two or more directions that are transverse to each other; and
wherein said central fixed standoff and said plurality of floating standoffs form a gap between said stainless steel panel and said support structure permitting convective cooling and shading of said support structure from solar radiation.

2. The system as recited in claim 1, wherein each floating standoff of said plurality of floating standoffs includes an enlarged aperture with a clearance that accommodates movement of each stainless steel panel from thermal expansion such that each of said plurality of floating standoffs are movable relative to said support structure.

3. The system as recited in claim 1, wherein said support structure is adjacent to said concentrated solar power receiver panel.

4. The system as recited in claim 1, wherein said cover assembly comprises an access door, said cover assembly adjacent to said concentrated solar power receiver panel.

5. The system as recited in claim 1, wherein said stainless steel panel is manufactured of Aluminized 310s stainless steel.

6. The system as recited in claim 1, wherein said stainless steel panel is adjacent to said concentrated solar power receiver panel, said stainless steel panel of said thermal shield and said concentrated solar power receiver panel extending along respective planes that are parallel to each other.

7. The system as recited in claim 1, wherein said stainless steel panel is a thermal shield that protects said solar power receiving system from heliostat spillage that misses said CSP receiver panel.

8. The system as recited in claim 1, wherein said central fixed standoff includes a small aperture fastener such that said central fixed standoff does not move with respect to said support structure.

9. The system as recited in claim 1, wherein said stainless steel panel is sloped and displaced from said concentrated solar power receiver panel.

10. A solar power system comprising:
a support structure;
a solar power receiver including a concentrated solar power receiver panel and a header assembly mounted to said support structure, wherein the header assembly is configured to communicate and distribute a thermal transfer fluid through the solar power receiver such that the thermal transfer fluid is heated by concentrated solar radiation received by said concentrated solar power receiver panel;
at least one cover assembly to protect said support structure and the header assembly from heliostat spillage that misses said concentrated solar power receiver panel, said at least one cover assembly comprising a thermal shield assembly comprising a first and second plurality of stainless steel panels, wherein a surface of said first and second plurality of stainless steel panels is coated with an aluminum coating, wherein the first plurality of stainless steel panels includes a first panel supported upon a first central fixed standoff and a first plurality of floating standoffs such that said first plurality of floating standoffs accommodate movement of the first panel with respect to said support structure, wherein said first plurality of floating standoffs surround the first central fixed standoff on at least three sides, and wherein said first plurality of floating standoffs are each configured to float relative to said support structure in two or more directions that are transverse to each other, said first panel being spaced away from said support structure a first distance from said support structure; and wherein said second plurality of stainless steel panels includes a second panel supported upon a second central fixed standoff and a second plurality of floating standoffs such that said second plurality of floating standoffs accommodate movement of said second panel with respect to said support structure for thermal expansion, wherein said second plurality of floating standoffs surround the second central fixed standoff on at least three sides, and wherein said second plurality of floating standoffs are each configured to float relative to said support structure in two or more directions that are transverse to each other, said second panel being spaced away from said support structure a second distance from said support structure to provide convective cooling and such that said second plurality of floating standoffs accommodate movement of the second panel, said second distance being different than said first distance, and wherein said first and second central fixed standoffs are fixed relative to said support structure and fixed relative to said respective first and second panels.

11. The system as recited in claim 10, wherein each floating standoff of the first plurality of floating standoffs includes an enlarged aperture with a clearance that accommodates movement of said first panel from thermal expansion such that each floating standoff of the first plurality of standoffs is movable relative to said support structure.

12. The system as recited in claim 10, wherein said support structure is adjacent to said concentrated solar power receiver panel.

13. The system as recited in claim 10, wherein said support structure includes said cover assembly and wherein said support structure is adjacent to said concentrated solar power receiver panel.

14. The system as recited in claim 10, wherein said support structure comprises an access door of a cover assembly, said cover assembly adjacent to said concentrated solar power receiver panel.

15. The system as recited in claim 6, wherein said concentrated solar power receiver panel and said stainless steel panel of said thermal shield are both configured to receive solar radiation unobstructed by each other.

16. The system as recited in claim 10, wherein said first panel and said second panel are adjacent to each other and extend along respective planes that are not parallel to each other.

17. The system as recited in claim 10, wherein said first and second panels are aligned with said concentrated solar power receiver panel.

18. The system as recited in claim 10, wherein said first panel and said second panel are generally aligned along a straight line.

19. The system as recited in claim 10, wherein the aluminum coating is diffusion bonded to the first and second plurality of stainless steel panels.

20. The system as recited in claim 11, wherein each floating standoff of said second plurality of floating standoffs includes an enlarged aperture with a clearance that accommodates movement of said second stainless steel panel from thermal expansion such that each of said second plurality of floating standoffs is movable relative to said support structure.

* * * * *